April 16, 1963 G. SONDER ET AL 3,085,400
COOLING FLUID IMPELLER FOR ELASTIC FLUID TURBINES
Filed March 23, 1959

INVENTORS.
GERHARD SONDER
ROBERT F. LEIS
BY William L. Ericson
ATTORNEY—

United States Patent Office 3,085,400
Patented Apr. 16, 1963

3,085,400
COOLING FLUID IMPELLER FOR ELASTIC
FLUID TURBINES
Gerhard Sonder, Cambridge, and Robert Francis Leis, Wakefield, Mass., assignors to General Electric Company, a corporation of New York
Filed Mar. 23, 1959, Ser. No. 801,148
6 Claims. (Cl. 60—39.66)

This invention relates to cooling fluid vanes, and more particularly to an improved cooling fluid vane construction for use in an elastic fluid turbine engine.

In a conventional gas turbine engine generally comprising an air compressor, combustion products generation means, a turbine wheel, and a duct connecting these elements in serial fluid flow relation, the high temperature of the combustion products calls for the use of cooling means for the turbine wheel. The cooling means may conveniently comprise a conduit receiving air bled from the compressor and conveying it to the turbine wheel, the conduit being spaced from the duct for the combustion products to minimize heat exchange therewith. An arrangement of this kind is shown and described in application Serial No. 630,612 of Gerhard Sonder, filed December 26, 1956 and assigned to the assignee of this application, now U.S. Patent No. 2,948,505.

It has become common practice to utilize a hollow axial flow compressor rotor in engines of this kind, having a plurality of axially spaced rows or stages of rotor blades mounted thereon. The rotor may be fabricated from a plurality of axially spaced disks, joined at their peripheries by annular torque rings; but in engines of small size we have found it more convenient to cast or machine the disks and torque rings as an integral rotor. The disks are formed with a central bore along the axis of the rotor, for lightening and passage of cooling air. The blades extend radially outwardly into an annular duct, for supplying compressed air to the combustion products generation means. Cooling air for the turbine wheel is bled from the annular duct through bleed openings formed in a torque ring of the rotor between adjacent disks, and into the interior of the rotor, and thence passed to the turbine wheel through the central bore of the disks and the cooling air conduit previously mentioned. This flow is produced by the differential pressure of the air bled from the compressor over the combustion products in the turbine exhaust passage, into which the cooling air is exhausted from the turbine wheel.

If the cooling air is allowed to circulate freely in the hollow compressor rotor within the annular plenum chamber defined by the torque ring and the disks adjacent the inlet openings, it has been found that a free vortex flow tends to develop. In this flow the tangential velocity of the air varies inversely with its radial distance from the axis of rotation. Consequently the pressure of the air as it approaches the axis of the rotor is sharply reduced, and the flow toward the turbine wheel is greatly inhibited.

In order to prevent such a free vortex flow, it has previously been proposed to provide vanes within the rotor lying in radial planes. These vanes force the cooling air to rotate in the manner of a solid, i.e., with a constant angular velocity and a tangential velocity directly proportional to the radial distance from the axis. This arrangement has proven effective in maintaining adequate pressure within the rotor to permit full flow of cooling air to the turbine wheel.

In previous practice, the vanes have extended axially between adjacent disks, and have been secured to the disks or to a tube fitted through the central bores of the disks, by welding, riveting, or by threaded fasteners. As a result, the fastening means have been subjected to the stresses induced by centrifugal force acting upon the vanes, as well as to that induced by their own inertia.

It is an object of our invention to provide an improved cooling fluid vane of the kind described, which is mountable in the rotor upon an inner surface of a torque ring so that centrifugal stresses are taken by the rotor rather than by the vane fastening means. It is a corollary object to provide an improved cooling fluid vane which affords increased rigidity, and which is simple to manufacture.

Other objects and advantages of our invention will become apparent as the description proceeds.

Briefly stated, in accordance with one aspect thereof, our invention may be carried out by providing a cooling fluid vane having a transverse mounting web formed with a convex surface of revolution conforming to the interior concave surface of revolution of the compressor rotor, or a torque ring portion thereof, between adjacent disks. The vane is held in place by centrifugal force during operation of the turbine engine, due to the abutment of the mounting web upon the interior surface of the rotor. The web is located by means of suitable fasteners, which secure the vane in place while the engine is inoperative and stationary. Suitable bleed openings are formed in the torque ring portion of the rotor surface, circumferentially spaced from the vane. The space between adjacent disks and within the intermediate torque ring portion of the rotor thus forms a cooling air plenum chamber receiving the vane.

Cooling air may then be passed from the plenum chamber through the central bores of the disks to a suitable conduit for conveyance to the turbine wheel or other parts of the engine which it is desired to cool; although these means form no part of the present invention, and any desired arrangement may be used to utilize the cooling air collected in the plenum chamber.

While the specification concludes with claims particularly pointing out and distinctly claiming the subject matter which we regard as our invention, it is believed that the invention may be more clearly understood from the following description of a preferred embodiment, referring to the drawings, in which:

Figure 1:
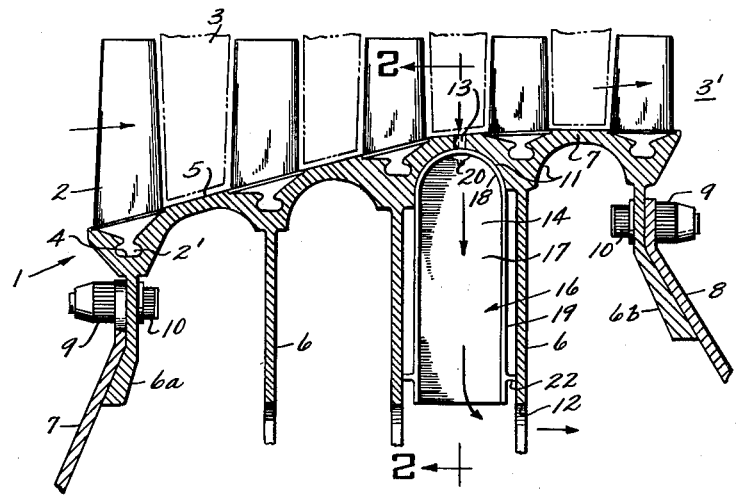
FIG. 1 is a fragmentary cross-sectional view of a compressor rotor incorporating a preferred embodiment of our cooling fluid vane.

In the drawings, a bladed hollow compressor rotor is generally shown at 1. The rotor includes a number of rows or stages of axially-spaced blades 2, which are intercalated between stationary guide-vanes 3. The latter are supported by a casing structure (not shown) in a duct 3' formed thereby. Blades 2 include root portions 2' which are received in dovetail slots 4 formed in an outer surface 5 of the rotor. This structure is of a kind well known in the art, forming no part of the present invention. The rotor includes axially-spaced disks 6, corresponding in number and location to the rows of blades 2, and connected by means of torque-ring portions 7. At the ends thereof, the rotor is provided with frusto-conical disks 6a and 6b, which are secured to frusto-conical shaft members 7 and 8, respectively, by means of nuts 9 and bolts 10, or other suitable fasteners. The disks 6, 6a, and 6b, and portions 7 may be separately formed, or may be integrally cast or machined to form a unitary structure as shown, which is especially desirable in engines of small size. The rotor thus has a smooth outer surface 5, and interior surfaces 11 of portions 7, intermediate adjacent ones of disks 6a, 6, and 6b. Inner surfaces 11 are concave surfaces of revolution. A central bore 12 is formed through the centers of disks 6, for lightening the disks, and also to permit the passage of cooling air axially through the rotor.

Shaft members 7 and 8 are supported in suitable bearings (not shown). Rotor 1 is rotatively driven through shaft 8 by a turbine wheel 32, forming a portion of an associated elastic fluid turbine engine 30. Air is passed through blades 2 in duct 3' in the direction shown by the arrows, compressed, and passed in serial flow relation through suitable combustion products generation means 31 and the turbine, which extracts energy from the combustion products to drive the compressor rotor 1. The engine is of a type well known in the art, and will not be further described.

In order to cool the turbine wheel 32 and other parts of the engine, bleed openings 13 are formed in one of the torque ring portions 7. Cooling air enters the interior of the rotor 1 through bleed openings 13, and is received in a plenum chamber 14 formed by two of disks 6 adjacent the bleed openings, and the intermediate torque ring portion 7. In the embodiment shown, bleed openings 13 are formed through only one torque ring portion 7, but they may be located at any point along the rotor at which the desired pressure exists. The air is passed from the plenum chamber 14, through central opening 12, to a suitable duct which is in cooling fluid communication with the turbine wheel or other engine parts to be cooled. The shaft 33 connecting the turbine wheel 32 and the compressor rotor 1 is formed with hollow passages through which the air may flow. The cooling air flow is produced by the differential in pressure of the air bled from the compressor through openings 13 over the combustion products in the turbine exhaust passage, into which the cooling air is exhausted after cooling the turbine wheel.

However, it has been found that the cooling air flow is greatly inhibited if the air is allowed to circulate freely in the plenum chamber, because a free-vortex flow is induced. The probable cause of this phenomenon is that the air flowing through openings 13 has received a tangential velocity equal to that of the openings. The air will tend to conserve angular momentum equivalent to this initial tangential velocity. The natural process for this conservation is free-vortex flow, in which the tangential velocity is inversely proportional to the radius, i.e. an ever increasing tangential velocity towards the center of the vortex. Thus a low pressure center develops near the axis of the rotor; and the rate of the flow of cooling air to the turbine wheel is greatly reduced.

This phenomenon has been known previously, and it has been proposed to place radially-extending vanes within the rotor to force the air to rotate in the manner of a solid, i.e., with a tangential velocity directly proportional to the radius of rotation of the air. It has been found that such vanes greatly improve the rate of flow of the cooling air, because the pressure of the cooling air is maintained at a relatively high level as it approaches the axis of the rotor.

We provide an improved cooling air vane 16 for forcing the cooling air in plenum chamber 14 to rotate in the desired manner. Vane 16 includes planar portion 17, and an integral web portion 18 extending transversely to the planar portion along an end edge thereof. Web portion 18 joins leg portions 19 extending along opposite side edges of planar portion 17, to form a unitary rigid structure.

Figure 2:
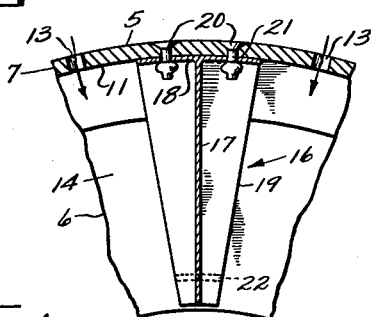
FIG. 2 is a fragmentary sectional view of the compressor rotor, taken along line 2—2 in FIG. 1.
Figure 3:
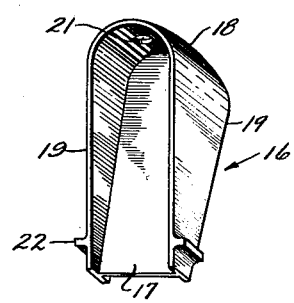
FIG. 3 is a view in perspective of the cooling fluid vane of FIG. 1.
Figure 4:
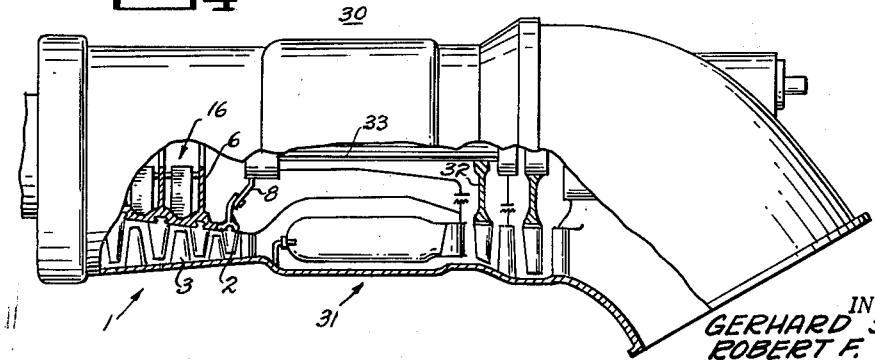
FIG. 4 is a view partially in section of an elastic fluid turbine engine incorporating the preferred embodiment of our cooling fluid vane.

Web portion 18 is formed as a convex surface of revolution as viewed in FIG. 2, to conform to interior concave surface of revolution 11 of torque ring portion 7, and is located in abutment thereagainst by means of rivets 20 or other suitable fasteners. Web portion 18 is formed with openings 21 to receive rivets 20 therethrough. The web portion is also curved axially to conform to surface 11 as viewed in FIG. 1. Vane 16 extends radially inwardly to the edges of central openings 12 of the disks. In the embodiment shown, vane 16 is axially shorter than the spacing between adjacent disks 6. We therefore form legs 19 with axially extending tabs 22, to locate the inner end of the vane and restrain axial vibration thereof.

It will be apparent that centrifugal force serves to retain vane 16 in position upon surface 11 of torque ring portion 7 during rotation of rotor 1, and that the torque ring portion absorbs this force. Rivets 20 merely serve to locate the vane circumferentially; they hold it in place radially only when the engine is stationary and not operating. During normal operation, the rivets are subject only to the centrifugal stresses induced by their own mass, and the structure therefore gives improved resistance to fatigue failure.

In rotors having cylindrical rather than axially curved internal surfaces 11, a web portion 18 would be formed as a cylinder conforming to such internal surface, and would not be axially curved as viewed in FIG. 1.

It is generally desirable to provide cooling fluid vanes 16 in diametrically opposed pairs, in order to maintain the balance of the rotor as well as to contribute to the prevention of a free-vortex flow pattern of the cooling air within the rotor.

A cooling fluid vane according to our invention is very easy and inexpensive to manufacture, since a plurality of them may be integrally cast as a complete annulus having a plurality of planar portions 17 radially disposed therein, and severed along radial planes. The vane may, of course, alternatively be fabricated by welding planar portion 17 to web portion 18, or by machining a solid wedge-shaped blank.

It will thus be seen that we have provided an improved cooling fluid vane for turbine engines, which is rigid, easily mountable in the engine, and simple to manufacture. The improved vane also gives improved resistance to fatigue failure. It should be understood that our invention is not limited to specific details of construction thereof herein illustrated, and that modifications may occur to those skilled in the art without departing from the spirit and scope of our invention.

What we claim and desire to secure by Letters Patent of the United States is:

1. In an elastic fluid turbine engine, a bladed rotor, means for rotatably driving said rotor about an axis, a casing forming a fluid duct about said rotor, said rotor comprising at least a pair of axially spaced disks extending transversely to said axis and at least one annular torque ring portion peripherally interconnecting said disks, said torque ring portion having a surface interior to said rotor to form a plenum chamber with said disks, openings in said torque ring portion interconnecting said duct in fluid flow relation with said chamber, a vane for preventing free vortex flow of fluid in said chamber, said vane having a convex surface of revolution abutting and conforming to said interior surface of said torque ring, and fastening means locating said vane in abutment upon said interior surface of said torque ring.

2. In an elastic fluid turbine engine, a bladed rotor, means for rotatably driving said rotor about an axis, a casing forming a fluid duct about said rotor, said rotor being hollow and formed with an interior concave surface of revolution, openings in said rotor for connecting said duct in fluid flow relation with the interior of said rotor, and a vane for preventing free vortex flow of fluid in the interior of said rotor; said vane being integrally formed with a planar portion and a mounting web extending transversely to said planar portion, said mounting web being formed with a convex surface of revolution conforming to said interior surface of said rotor, and fastening means locating said surface of said mounting web in abutment upon said interior surface, whereby said vane projects into said hollow interior of said rotor.

3. In an elastic fluid turbine engine, the combination recited in claim 2, in which said mounting web extends transversely along an end edge of said planar portion, together with leg portions extending transversely along opposite side edges of said planar portion and joining said mounting web.

4. In an elastic fluid turbine engine, a bladed rotor, means for rotatably driving said rotor about an axis, a casing forming a fluid duct about said rotor, said rotor comprising at least a pair of axially spaced disks extending transversely to said axis and at least one annular torque ring portion peripherally interconnecting said disks, said torque ring portion having an interior concave surface of revolution to form a plenum chamber with said disks in the interior of said rotor, openings in said torque ring portion interconnecting said duct in fluid flow relation with said chamber, and a vane for preventing free vortex flow of fluid in the interior of said rotor; said vane being formed with a planar portion and a mounting web extending transversely to said planar portion, said mounting web being formed with a convex surface of revolution conforming to said interior surface of said torque ring, and fastening means locating said surface of said mounting web in abutment upon said interior surface, whereby said vane projects into said plenum chamber.

5. A cooling fluid vane for use in an elastic fluid turbine engine of the type comprising a bladed hollow compressor rotor having an interior concave surface of revolution, combustion products generation means, and a turbine wheel, arranged in serial fluid flow relation; said turbine wheel constructed and arranged to rotatively drive said compressor, bleed openings in said compressor rotor for bleeding cooling fluid therefrom, and duct means in fluid communication with said bleed openings to conduct cooling fluid to said turbine wheel; said cooling fluid vane being formed with a planar portion and a mounting web extending transversely to said planar portion, said mounting web being formed with a convex surface of revolution conforming to said interior surface of said hollow compressor rotor, and fastening means locating said surface of said mounting web in abutment upon said internal surface, whereby said vane projects into said hollow rotor to prevent free vortex flow of said cooling fluid about the interior of said rotor.

6. In an elastic fluid turbine engine, a bladed rotor, means for rotatably driving said rotor about said axis, a casing forming a fluid duct about said rotor, said rotor comprising at least a pair of axially spaced disks extending transversely to said axis and at least one annular torque ring portion peripherally interconnecting said disks, said torque ring portion having a surface interior to said rotor to form a plenum chamber with said disks, openings in said torque ring portion interconnecting said duct in fluid flow relation with said chamber, a vane for preventing free vortex flow of fluid in said chamber, said vane being formed with a planar portion and a mounting web extending transversely to said planar portion, said mounting web being formed with a convex surface of revolution conforming to said interior surface of said torque ring, tabs on each side of said vane to abut said disks and maintain said vane in position, and fastening means locating said vane in abutment upon said interior surface of said torque ring.

References Cited in the file of this patent

UNITED STATES PATENTS

| | | |
|---|---|---|
| 1,676,946 | Fechhemier | July 10, 1928 |
| 2,407,164 | Kimball | Sept. 3, 1946 |
| 2,520,697 | Smith | Aug. 29, 1950 |
| 2,783,613 | Von Zborowski | Mar. 5, 1957 |
| 2,850,261 | Rutkove | Sept. 2, 1958 |
| 2,873,944 | Wiese | Feb. 17, 1959 |
| 2,910,268 | Davis et al. | Oct. 27, 1959 |

FOREIGN PATENTS

| | | |
|---|---|---|
| 446,633 | Canada | Feb. 10, 1948 |
| 907,059 | France | June 11, 1945 |
| 1,127,026 | France | Aug. 6, 1956 |
| 580,805 | Great Britain | Sept. 20, 1946 |
| 622,181 | Great Britain | Apr. 27, 1949 |